United States Patent
Hochstetter et al.

(10) Patent No.: US 9,139,707 B2
(45) Date of Patent: Sep. 22, 2015

(54) THERMOPLASTIC COMPOSITE MATERIAL MADE FROM NATURAL FIBERS

(71) Applicant: ARKEMA FRANCE, Colombes Cedex (FR)

(72) Inventors: Gilles Hochstetter, Bernay (FR); Marc Audenaert, Bernay (FR); Thierry Briffaud, Caorches Saint Nicolas (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/404,718

(22) PCT Filed: May 30, 2013

(86) PCT No.: PCT/FR2013/051220
§ 371 (c)(1),
(2) Date: Dec. 1, 2014

(87) PCT Pub. No.: WO2013/178955
PCT Pub. Date: Dec. 5, 2013

(65) Prior Publication Data
US 2015/0126646 A1   May 7, 2015

(30) Foreign Application Priority Data

Jun. 1, 2012   (FR) .................................. 12 55110

(51) Int. Cl.
| | | |
|---|---|---|
| *B29B 15/12* | (2006.01) | |
| *C08J 5/24* | (2006.01) | |
| *B29C 43/24* | (2006.01) | |
| *B29C 51/02* | (2006.01) | |
| *B29C 70/48* | (2006.01) | |
| *B29C 70/52* | (2006.01) | |
| *B29B 11/16* | (2006.01) | |
| *B29K 77/00* | (2006.01) | |
| *B29K 105/08* | (2006.01) | |
| *B29K 311/00* | (2006.01) | |

(52) U.S. Cl.
CPC . *C08J 5/24* (2013.01); *B29B 15/12* (2013.01); *B29C 43/24* (2013.01); *B29C 51/02* (2013.01); *B29C 70/48* (2013.01); *B29C 70/52* (2013.01); *B29B 11/16* (2013.01); *B29K 2077/00* (2013.01); *B29K 2105/0872* (2013.01); *B29K 2311/00* (2013.01); *C08J 2301/02* (2013.01); *C08J 2377/00* (2013.01); *C08J 2477/06* (2013.01)

(58) Field of Classification Search
CPC .............. C08J 2377/00; C08J 2301/02; B29K 77/0872
USPC ............. 524/35, 607; 156/181, 307; 264/490, 264/331
See application file for complete search history.

(56) References Cited

U.S. PATENT DOCUMENTS

| | | | |
|---|---|---|---|
| 4,673,723 | A | 6/1987 | Cuzin |
| 4,820,367 | A | 4/1989 | Cuzin |
| 4,927,583 | A | 5/1990 | Lottiau et al. |
| 5,047,263 | A | 9/1991 | Glemet |
| 5,187,018 | A | 2/1993 | Glemet |
| 5,665,855 | A * | 9/1997 | Acevedo et al. .............. 528/353 |
| 7,084,213 | B2 | 8/2006 | McGrail et al. |
| 2004/0044141 | A1 | 3/2004 | McGrail et al. |
| 2012/0077398 | A1 | 3/2012 | Gaillard et al. |

FOREIGN PATENT DOCUMENTS

| | | | |
|---|---|---|---|
| EP | 0 174 225 | A1 | 3/1986 |
| EP | 0 425 341 | A1 | 5/1991 |
| EP | 0 581 641 | A1 | 2/1994 |
| EP | 0 581 642 | A1 | 2/1994 |
| EP | 0 739 924 | A1 | 10/1996 |
| FR | 2 579 133 | A1 | 9/1986 |
| FR | 2 603 891 | A1 | 3/1988 |
| FR | 2 694 008 | A1 | 1/1994 |
| WO | WO 03/014198 | A1 | 2/2003 |
| WO | WO 2010/130930 | A1 | 11/2010 |

\* cited by examiner

*Primary Examiner* — Kelechi Egwim
(74) *Attorney, Agent, or Firm* — Buchanan Ingersoll & Rooney P.C.

(57) ABSTRACT

A method of producing a composite material, comprising an assembly of natural fibers, impregnated with an amorphous or semi-crystalline thermoplastic polymer, said method including: i) a step of impregnating said assembly with a precursor composition in the molten state and including: a) at least one prepolymer P(X)n of said thermoplastic polymer, having a molecular chain P having, at the ends of same, n reactive functions X, with n ranging from 1 to 3, in particular n being 1 or 2, and preferably 2 b) at least one chain extender Y-A-Y including reactive functions Y with at least one of said functions X ii) a step of polymerization by mass (poly)addition, in the molten state, of said prepolymer with said chain extender with: said thermoplastic polymer being the result of said polymerization by mass polyaddition and said impregnation i) and polymerization ii) taking place at a temperature lower than 250° C.

26 Claims, No Drawings

THERMOPLASTIC COMPOSITE MATERIAL MADE FROM NATURAL FIBERS

The present invention relates to the production of a thermoplastic composite material based on natural fibers, to a product and a process, to a precursor composition and to a pre-impregnated fibrous material which are used for this production and to the uses associated with these materials as structural parts.

The use of natural fibers in thermoplastic composites is of ever increasing interest in the use of composites with raw materials of renewable and sustainable origin as a replacement for materials based on raw materials of nonrenewable fossil origin. Furthermore, in addition to natural fibers such as, for example, flax fibers are of interest for replacing synthetic fibers, in the interest of environmental preservation in general, to produce composites with a high content of renewable and sustainable raw materials. The lighter materials, which result therefrom, thus contribute to reducing energy consumption in the motor vehicle construction, aeronautical, shipbuilding and railway fields, where the composite parts are used with an improved ratio of mechanical performance per unit weight.

On the other hand, an important limitation in the broader use of natural fibers in composite materials is their lack of thermal stability at temperatures above 230° C., in particular above 250° C. More particularly, in the case of thermoplastic composites, in order for the thermoplastic matrix to successfully impregnate said fibers, it is essential to reduce the viscosity of the thermoplastic polymer in the molten state in order to make it possible for this polymer to impregnate the assembly of fibers. One means of reducing this viscosity is to increase the impregnating temperature in order to make this molten polymer more fluid, but temperatures which are high and above 230° C. will often be necessary, thereby making such a use incompatible with the thermal stability of the highly thermosensitive natural fibers which can, as a result, have their structure and performance levels affected starting from 230° C. Likewise, seeking to work under a stronger pressure for the impregnation in the molten state, even at a lower temperature, does not make it possible to obtain a good compromise of impregnation without avoiding the destruction and degradation of the performance levels of these fibers. Other prior art solutions for the impregnation of synthetic fibers in the production of composites comprising a thermoplastic matrix recommend the use of low Mw prepolymers which are reactive by polycondensation as described in FR 2 603 891, which describes a process for producing a composite material consisting of a polyamide matrix reinforced with long reinforcing fibers. These fibers are impregnated with a polyamide prepolymer or oligomer which comprises reactive end functions capable of reacting with one another by heating so as to elongate the polymer chain. The oligomer or the prepolymer has a low molecular weight, but the reactive functions react by polycondensation with, consequently, the formation of volatile condensation by-products (water). The presence of such volatile by-products limits the interest of this type of chemical reaction if the reaction by-products are not removed, but even in the latter case, additional process steps are required, thereby complicating it and reducing its productivity and increasing its cost. If these products are not removed, microbubbles then form in the material, which can affect the final performance levels of the composite material to the extent of making its use of no interest. Likewise, the use of low Mw nonreactive polymers is recommended in FR 2 936 441, but, in this case, the mechanical performance levels of the matrix are limited owing to the absence of chain elongation in the polymer of the thermoplastic matrix.

In the case of natural fibers, for good impregnation of these fibers by the thermoplastic resin in the molten state, the impregnating temperature must be well controlled and below 230° C. and preferably below 200° C. and more preferentially not exceeding 190° C., depending on the time of exposure to these temperatures and with this time controlled, in order to avoid the risk of thermal degradation of the structure of the fibers and of their performance levels. The challenge of the invention is therefore to find a solution for impregnating natural fibers which are not very thermally stable, which solution enables impregnation at a temperature <230° C., preferably <200° C. and more preferentially <190° C., so as not to thermally degrade them and so as not to thus affect the mechanical strength of these natural fibers and that of the composite material which results therefrom. This is obtained while guaranteeing a final thermoplastic matrix which has a molecular weight sufficiently high to guarantee that said composite material has the best mechanical performance levels during a mechanical stress. Indeed, the role of this thermoplastic matrix is to transfer the mechanical stress supported by the composite to said natural reinforcing fibers. This transmission or transfer of stress is optimal when the impregnation and the adhesion of this matrix to said fibers are also optimal. This is possible when the impregnation is carried out with said matrix having a low viscosity. It is obvious that obtaining a low viscosity for a final thermoplastic matrix of high molecular weight is not possible because of this weight and especially because of the limitation of the maximum impregnating temperature imposed by the low thermal stability of said natural fibers. The use of lower molecular weights of said thermoplastic polymer cannot satisfactorily solve this problem, since lower molecular weights do not enable a high mechanical strength in the range of use, in particular during an impact.

Consequently, in order to be able to remedy these drawbacks, it is necessary to seek a method for producing said composite which allows the in situ polymerization of said thermoplastic polymer from reactive constituents which, in a reactive mixture, have viscosities which are significantly reduced at the start compared with said thermoplastic polymer in the molten state. Among the prior art solutions for reducing the viscosity during the impregnation is the use of monomers or of pre-polymers by condensation reaction but with the presence or elimination of products which are gaseous or volatile under the conditions for processing said composite material and which can thus generate, during the processing of the composite in a closed mold, microbubbles of said by-product compound in the gaseous state. However, in this in situ preparation, it is necessary to avoid chemistry which uses monomers which are potential volatile or gaseous products during the processing, or chemistry which gives rise to by-products which are eliminated, for instance, by an acid-amine polycondensation reaction using functionalized prepolymers which can condense and give rise to the elimination of one condensation water molecule per amide group formed. Indeed, such eliminated molecules can create, in the gaseous state, during processing at higher temperature, microbubbles in the final composite material, which weaken said material. The condensation by-products which are eliminated can also affect the dimensional stability of the molded composite part through volume shrinkage during the elimination, in addition to affecting its mechanical or chemical performance levels through this even residual presence.

Furthermore, it is essential that there is an absence of any volatile or gaseous compound used in this preparation method, such as solvents or monomers, and it is obligatory to go from a fluid state to a solid state via a bulk reaction with neither solvents nor gaseous products or by-products.

The present invention proposes using a precursor composition for said thermoplastic polymer which is in fact a mixture of reactive prepolymers for said thermoplastic polymer of low Mn, combined with at least one chain extender which reacts with said prepolymer by bulk polyaddition reaction without any elimination of volatile or gaseous by-products. More particularly, this composition may comprise a specific additive which absorbs at a wavelength of a radiation, such as laser radiation, for example UV or IR laser radiation, thus allowing the uniform and instantaneous heating of said composition and/or of the prepreg during the final processing or at least one filler which conducts electricity and optionally heat, in particular carbon nanotubes or nanofibrils, thus allowing uniform and instantaneous heating of said composition for the melting and impregnation of said natural fibers and/or of the prepreg which results therefrom during its final processing into a final molded composite material. Such a particular process thus makes it possible to shorten the period of exposure of the natural fibers without a temperature gradient that exists with other conventional heating systems.

No prior art document either describes or suggests such a solution for solving said technical problem, in the case of natural fibers.

The present invention relates first to a process for producing a composite material comprising a fibrous assembly of one or more natural reinforcing fibers, said assembly being impregnated with at least one amorphous or semicrystalline thermoplastic polymer and said process comprising: i) a step of impregnation of the assembly with a precursor composition in the molten state comprising: a) at least one prepolymer P(X)n of said thermoplastic polymer and b) at least one chain extender Y-A-Y comprising functions Y which react with at least one of the functions X, ii) a step of bulk polymerization by (poly)addition, in the molten state, of said prepolymer with said chain extender, with said thermoplastic polymer of the thermoplastic matrix being the result of said bulk polymerization by polyaddition and with the impregnation i) and polymerization ii) steps taking place at a temperature below 250° C. and in particular below 230° C.

The second subject of the invention relates to a reactive precursor composition for carrying out the process according to the invention, which comprises a) a specific prepolymer and b) a specific chain extender according to the invention, with said thermoplastic polymer resulting from the precursor composition by bulk polyaddition reaction and said composition having a melting point (if semicrystalline prepolymer) or softening temperature (if amorphous prepolymer) below 220° C., preferably below 210° C., more preferentially below 200° C. and even more preferentially below 190° C.

The invention subsequently covers a preimpregnated fibrous material which results from the impregnation in the molten state of an assembly of one or more natural reinforcing fibers with at least one precursor composition according to the invention.

The invention also relates to the use of a precursor composition as defined according to the invention, for impregnating an assembly of one or more natural reinforcing fibers and for producing a preimpregnated fibrous material.

Finally, the present invention covers a composite material obtained by means of the production process of the invention and more particularly using at least one precursor composition of the invention, for the impregnation step i) and for the polymerization step ii).

Thus, the first subject of the present invention is a process for producing a composite material which comprises a fibrous assembly of one or more natural reinforcing fibers, with said assembly being impregnated with at least one amorphous or semicrystalline thermoplastic polymer, said process comprising:
i) a step of impregnation of said assembly with a precursor composition in the molten state (after melting) and comprising:
   a) at least one prepolymer P(X)n of said thermoplastic polymer, comprising a molecular chain P (signifying hydrocarbon-based chain) having, at its ends, n reactive functions X, with n ranging from 1 to 3, in particular n being 1 or 2, preferably 2,
   b) at least one chain extender Y-A-Y comprising functions Y which react with at least one of said functions X,
ii) a step of bulk polymerization by poly(addition), in the molten state, of said prepolymer with said chain extender, and in which:
   said thermoplastic polymer of the thermoplastic matrix is the result of said bulk polymerization by polyaddition and
   said impregnation i) and polymerization ii) steps take place at a temperature below 250° C., in particular below 245° C., preferably below 230° C., particularly preferably below 210° C., more preferentially below 200° C. and even more preferentially not exceeding 190° C.

It should be noted that said impregnation temperature can be combined with an impregnation time for said (fibrous) assembly which generally does not exceed 30 seconds and preferably remains less than 20 seconds. This time can vary inversely relative to the impregnation temperature used. It is shorter for a higher temperature and longer for a lower temperature.

According to one particular mode, the process of the present invention comprises an additional step iii) of processing and final forming of said composite material. More particularly, said precursor composition has a melting point (if semicrystalline prepolymer) or a softening temperature (if amorphous prepolymer) below 220° C. and preferably below 210° C., more preferentially below 200° C. and even more preferentially below 190° C.

The melting point Mp and the crystallization temperature Ct are measured by DSC after a first heating, according to ISO 11357-3. The heating and cooling rate is 20° C./min.

More particularly, according to one preferred mode of the present invention, said precursor composition that can be used according to said process of the invention, in addition to said prepolymer a) and to said extender b), comprises c) at least one filler which conducts electricity and optionally heat and/or d) at least one additive which absorbs a laser radiation, such as UV or IR laser radiation, and said process comprises a step of heating by microwaves or by induction in the case of the presence of c) and/or by laser radiation in the case of the presence of d), preferably said heating step concerning said precursor composition and/or the prepreg which results from said impregnation i) and/or said final forming of said composite material during said processing step iii). This means that said heating step can concern the melting of said precursor composition for the impregnation of said natural fibers and optionally the polymerization and/or said processing step iii) using a fibrous prepreg thus heated by microwaves or by induction. This heating step still remains valid but is by radiation in the case where said composition comprises, in addition to said prepolymer a) and to said extender b), at least one specific additive which absorbs at a specific length of said radiation, also signifying specific wavelength range of said radiation. These two heating means thus allow selective and uniform heating for said composition and/or fibrous impregnated material and/or composite material during the processing thereof, with uniform impregnation as a structure of the uniform matrix polymer and uniform performance levels of said composite material, without any particular risk of thermal degradation of said natural fibers because of a thermal gradient (temperature gradient) in the composition or impregnated material or composite material, characteristic of the conventional heating methods. The combination of the two methods, i.e. with conductive filler in said composition and heating by microwaves and induction or additive which absorbs a radiation in said composition with heating by radiation, as described above, is possible with selective use of one method in one step and the other in another step of said process.

Said prepolymer P(X)n defined above is a prepolymer of said final thermoplastic polymer constituting the thermoplastic matrix for the composite material of the invention and, as such, this prepolymer comprises, in its molecular chain P, repeat units corresponding to said thermoplastic polymer. By definition, the molecular weight of said prepolymer is lower than that of the final thermoplastic polymer which will be approximately a multiple of that of said prepolymer, to the approximation of the molecular weight of the units of said extender, which extender serves as a junction between at least two prepolymer units (chains).

Thus, said final thermoplastic polymer comprises one or more structural units of said chain extender in the reacted state by reaction between the functions Y of said extender and the functions X of said prepolymer. For example, in the case where said polymer is a polyamide, this means that its main structure is a polyamide (amide repeat units) resulting from the chain elongation of the polyamide prepolymer P(X)n by means of one or more chain extenders Y-A-Y.

Consequently, the chain of the final thermoplastic polymer (after complete polymerization of the precursor composition) consists of the linking of said prepolymers P(X)n, joined (linked) to one another by at least one chain extender Y-A-Y with one or more extenders acting as "junctions" between the prepolymer chains, by reaction between the functions X and Y, as defined above according to the invention.

According to a first particular embodiment of said process, said prepolymer P(X)n has an aliphatic structure and said thermoplastic polymer is semicrystalline and preferably is a semicrystalline polyamide. According to a more particular mode, said extender has, independently, i.e. independently of said prepolymer or also like said prepolymer, an aliphatic structure.

According to a second particular mode, said prepolymer P(X)n can have a semi-cycloaliphatic, semi-arylaliphatic and/or semi-aromatic structure and said thermoplastic polymer is amorphous and is preferably an amorphous polyamide.

According to another particular mode of the process of the invention, n=2 and said functions Y react with the two functions X. In this case, n=2 signifies a prepolymer which is close to bifunctional with respect to X, X signifying, according to the invention, functions which are identical and nonreactive with one another, in particular with an accuracy for n which may be ±10%. For n=1, the prepolymer is monofunctional, in particular with an accuracy for n which may be ±10%. For n ranging from 1 to 3, this means that n is the average number of functions X per prepolymer, in particular with the same accuracy. For n greater than 2, crosslinking is excluded and, in this case, measures are taken to ensure that the average functionality in terms of reactive functions of the system (X and Y) per reagent (prepolymer and extender) is at most equal to 2, i.e. less than or equal to 2. More particularly, for n>2 and ranging up to 3, the extender is added in large excess so as to prevent any gelling (crosslinking) even with total conversion of the functions X.

More particularly in this process, said impregnation step is carried out at a temperature such that the viscosity of said precursor composition in the molten state does not exceed, during the impregnation, 100 Pa·s and preferably does not exceed 50 Pa·s and more preferentially does not exceed 10 Pa·s. Said viscosity is measured at said temperature under a shear of $100\ s^{-1}$ between two parallel planes 50 mm in diameter, using a rheometer, for example a Physica MCR301. The impregnation temperature is adjusted if necessary so that the viscosity is in said viscosity range, preferably by associating therewith an impregnation time as described above.

According to this process, the polymerization step ii) can be carried out at a temperature ranging from 120° C. to less than 230° C., preferably from 150° C. to less than 210° C., more preferentially from 150° C. to less than 200° C. and even more preferentially from 150° C. to 190° C.

The temperature for carrying out step iii) can lie within the polymerization temperature range, as indicated above, and can be identical to the polymerization temperature.

Said thermoplastic polymer can be chosen from: at least one polyamide or at least one copolymer of said polyamide, including polyamide-polyether or at least one mixture thereof, and preferably from at least one polyamide. The choice of the thermoplastic polymer of the matrix of the composite material implicitly sets the choice of the prepolymer P(X)n, from which the repeat units of said final thermoplastic polymer will be derived. Regarding the preferred reactive functions X borne by said prepolymer, they are chosen from: hydroxyl (OH), amine ($NH_2$) or carboxy (COOH) and preferably from amine and carboxy.

For example, in the case where said prepolymer is a polyamide (including copolyamide), it is obtained by polycondensation between a diacid and a diamine and, if there is an excess of amine, the end functions X will be amines and, if there is an excess of acid, the end functions X will be carboxy. If the polyamide derives from self-polycondensation of an aminocarboxylic acid, in this case one of the two functions is modified with an excess of diacid if X=carboxy is intended or with an excess of diamine if functions X=amines is intended.

For X=OH, it is possible to modify a prepolymer which ends with X=carboxy by modification with an excess of diol.

For n>2 (up to 3), the functionality n of the prepolymer is regulated using, for example, a triamine and a diamine as amine component for reacting with a diacid, with the triamine/diamine proportion adjusted according to the intended n.

According to this process, said prepolymer P(X)n can have a number-average molecular weight Mn ranging from 500 to 10 000, preferably from 1000 to 10 000, more preferentially from 1000 to 6000 and even more preferentially from 1000 to 2500 $g \cdot mol^{-1}$. The Mn can be measured by potentiometric assaying or titration of the end functions X and from the functionality ($n_{calc}$) calculated from the balance of material and functionality of the various reagents. More particularly, the Mn for the prepolymer P(X)n, but which remains valid for the final polymer, is calculated from the assaying (by potentiometry) of the end functions X (concentration in meq/g of X) and from the calculated theoretical functionality n of said prepolymer ($n_{calc}$) given the balance of material and functionality of the reagents present, with Mn and $n_{calc}$ being defined in the following way:

$$Mn = n_{calc} * 1000/[X]$$

with $n_{calc} = 2[X]/([X]+[M]-[B])$ and finally $Mn = 2000/([X]+[M]-[B])$ where [X], [M] and [B] are respectively the molar concentrations of reactive functions X (measured), of ends of nonreactive chains M (obtained, for example, by calculation starting from the amount of monofunctional reagent, if introduced in the charging) and of trifunctional branching points, B (obtained, for example, by calculation starting from the amount of trifunctional reagent if introduced in the charging), the Mn being expressed in g/mol and the concentrations in meq/g.

Mention might also be made of the corresponding inherent viscosity, measured in m-cresol, ranging from 0.2 to 1.0, preferentially from 0.2 to 0.8 and better still from 0.2 to 0.5 dl/g. The measurement of intrinsic or inherent viscosity is carried out in m-cresol. The method is well known to those skilled in the art. Standard ISO 937 is followed, but while changing the solvent, which is m-cresol in place of sulfuric acid and the temperature being 20° C.

More particularly, said prepolymer has a molecular weight Mn which is at least approximately half that of the final thermoplastic polymer and, in this case, said final thermoplastic polymer may comprise two chains of prepolymer P(X)n for (i.e. with) one (or one unit of) extender Y-A-Y.

The targeted number-average molecular weight of said final thermoplastic polymer preferably corresponds to intrinsic or inherent viscosity values, measured in m-cresol, of greater than 1 dl/g, preferably from 1 to 3 dl/g and more preferentially from 1.2 to 2 dl/g. The latter viscosity ranges can be considered to be equivalent to Mn values ranging from 10 000 to 40 000, preferably from 12 000 to 30 000. The weights Mn can be measured by titration of the end functions and of the functionality, the latter being calculated via the balance of material and functionality of the reagents as explained above.

In order to reach the high molecular weights for said final thermoplastic polymer according to the invention, it is necessary to adjust the Y/X molar ratio according to the weight Mn or intrinsic viscosity intended for the final polymer of the thermoplastic matrix. This ratio can vary between 0.5 and 1.5, in the knowledge that the closer this ratio is to 1, the higher the weight Mn or the intrinsic viscosity.

According to one more particular mode of the process according to the invention, said prepolymer P(X)n corresponds to:
- n=1 to 3, in particular n=1 or 2, preferably 2,
- X is a reactive function among: —OH, —NH$_2$ or —(C=O)OH, preferably —(C=O)OH (or CO$_2$H) or —NH$_2$,
- P is a hydrocarbon-based chain which may be aliphatic, semi-cycloaliphatic, semi-arylaliphatic and/or semi-aromatic.

The term "semi-aromatic" structure means, according to the present invention, that said structure contains at least 10 mol % and up to 50 mol % of aromatic constituents relative to the total constituents, with the additional constituents being aliphatic only or with the presence of arylaliphatic and/or cycloaliphatic constituents, said aliphatics being in predominant (higher) molar proportion relative to the other (total) additional constituents and with said arylaliphatics and/or said cycloaliphatics remaining in molar proportions lower than that of said aromatics, preferably at least 20% lower. Proportions 20% lower means here that the molar ratio of said arylaliphatics and/or cycloaliphatics relative to said aromatics does not exceed 0.8.

The semi-arylaliphatic or semi-cycloaliphatic structures are defined in an analogous manner:

A "semi-arylaliphatic" structure means, according to the present invention, that it contains at least 10 mol % and up to 50 mol % of arylaliphatic constituents relative to the total constituents, with the additional constituents being aliphatic only or with the presence of aromatic and/or cycloaliphatic constituents, said aliphatics being in predominant molar proportion relative to the other additional constituents and said aromatics and/or said cycloaliphatics remaining in lower molar proportions, preferably at least 20% lower, that that of said arylaliphatics.

A semi-cycloaliphatic structure means that it contains at least 10 mol % and up to 50 mol % of cycloaliphatic constituents relative to the total constituents, with the additional constituents being aliphatic only or with the presence of aromatic and/or arylaliphatic constituents, with said aliphatics being in predominant molar proportion relative to the other additional constituents and said aromatics and/or said arylaliphatics remaining in lower molar proportions, preferably at least 20% lower, than that of said cycloaliphatics.

An aliphatic structure according to the present invention signifies that it is 100 mol % composed of aliphatic constituents and thus, by definition, the structure excludes any presence of aromatic, cycloaliphatic or arylaliphatic groups.

According to one more particular process:
when X is NH$_2$ or OH:
either the chain extender Y-A-Y corresponds to:
  Y chosen from the groups: maleimide, under the condition that, if X=amine, the latter is secondary, optionally blocked isocyanate, oxazinone or oxazolinone, preferably oxazinone or oxazilinone, and
  A is a carbon-based spacer (or carbon-based radical) bearing the reactive functions or groups Y, A being chosen from:
    a covalent bond between two functions (groups) Y in the case where Y=oxazinone or oxazolinone, or
    a hydrocarbon-based chain having a molecular weight of 14 to 200 g·mol$^{-1}$,
or the chain extender Y-A-Y corresponds to Y being a caprolactam group and to A possibly being a carbonyl radical such as carbonylbiscaprolactam or A possibly being terephthaloyl or isophthaloyl,
or said chain extender (Y-A-Y) corresponds to Y being a cyclic anhydride group and said extender is then chosen from: an aromatic and/or cycloaliphatic, preferably aromatic, dicarboxylic anhydride,
and when X is —(C=O)OH (or —CO$_2$H):
the chain extender Y-A-Y corresponds to:
  Y chosen from the groups: oxazoline, oxazine, imidazoline or aziridine, such as 1,1'-isophthaloyl bis(2-methylaziridine) or such as the equivalent aziridine with terephthaloyl replacing isophthaloyl,
and to
  A being a carbon-based spacer (radical) as defined above.

Said extender can correspond to A representing a single bond (in the case of an extender of Y—Y type such as bisoxazoline), an alkylene, such as —(CH$_2$)$_m$— with m ranging from 1 to 14 and preferably from 2 to 10, a cycloalkylene (such as a 1,3- or 1,4-cyclohexylene) or an arylene (such as a 1,3- or a 1,4-phenylene).

More particularly, regarding said extenders Y-A-Y, when Y is chosen from oxazinone, oxazolinone, oxazine, oxazoline or imidazoline, in this case, A can represent an alkylene such as —(CH$_2$)$_m$— with m ranging from 1 to 14 and preferably from 2 to 10 or A can represent a cycloalkylene and/or an arylene which is substituted (alkyl) or unsubstituted, for instance benzenic arylenes such as o-, m-, or p-phenylenes, or naphthalenic arylenes, and A is preferably an arylene and/or a cycloalkylene.

In the case where Y represents a blocked isocyanate function, this blocking can be obtained with blocking agents for the isocyanate function, such as epsilon-caprolactam, methyl ethyl ketoxime, dimethylpyrazole, or diethyl malonate.

As examples of chain extenders with oxazoline or oxazine reactive functions Y suitable for carrying out the process according to the invention, reference may be made to those described under references A, B, C and D on page 7 of application EP 0 581 642 of the applicant and also to the processes for preparing same and their mode of reaction which are set out therein. A is bisoxazoline, B is bisoxazine, C is 1,3-phenylenebisoxazoline and D is 1,4-phenylenebisoxazoline.

As examples of chain extenders comprising an imidazoline reactive function Y suitable for carrying out the process according to the invention, reference may be made to those described (A to F) on pages 7 to 8 and in table 1 on page 8, in application EP 0 739 924 of the applicant and also to the processes for preparing same and their mode of reaction which are set out therein.

As examples of chain extenders comprising a reactive function Y=oxazinone or oxazolinone which are suitable for carrying out the process according to the invention, reference may be made to those described under references A to D on pages 7 to 8 of application EP 0 581 641 of the applicant and also to the processes for preparing same and their modes of reaction which are set out therein.

As examples of suitable oxazinone (ring comprising 6 atoms) and oxazolinone (ring comprising 5 atoms) groups Y, mention may be made of the groups Y derived from: benzoxazinone, oxazinone or oxazolinone, with, as spacer, it being possible for A to be a single covalent bond with the respective corresponding extenders being: bis(benzoxazinone), bisoxazinone and bisoxazolinone.

A can also be a C$_1$ to C$_{14}$, preferably C$_2$ to C$_{10}$, alkylene or an arylene, more particularly a phenylene (1,2- or 1,3- or 1,4-substituted with Y) or a naphthalene radical (disubstituted with Y) or a phthaloyl (iso- or terephthaloyl) or A can be a cycloalkylene.

For the functions Y such as oxazine (6-membered ring), oxazoline (5-membered ring) and imidazoline (5-membered ring), the radical A can be as described above with it being possible for A to be a single covalent bond and with the respective corresponding extenders being: bisoxazine, bisoxazoline and bisimidazoline. A can also be a C$_1$ to C$_{14}$, preferably a C$_2$ to C$_{10}$, alkylene or an arylene, and more particularly a phenylene (1,2- or 1,3- or 1,4-substituted with Y) or a naphthalene radical (disubstituted with Y) or a phthaloyl (iso- or terephthaloyl) or A can be a cycloalkylene.

In the case where Y=aziridine (nitrogenous heterocycle comprising 3 atoms, equivalent to ethylene oxide with the ether —O— being replaced with —NH—), the radical A can be a phthaloyl (1,1-iso- or terephthaloyl) with, as an example of an extender, 1,1'-isophthaloyl bis(2-methylaziridine).

As examples of suitable cyclic dianhydride extenders, mention may be made of the following: ethylenetetracarboxylic dianhydride, pyromellitic dianhydride, 3,3',4,4'-biphenyl-tetracarboxylic dianhydride 1,4,5,8-naphtalenetetracarboxylic dianhydride, perylenetetra-carboxylic dianhydride, 3,3',4,4'-benzophenonetetracarboxylic dianhydride, 1,2,3,4-cyclo-butanetetracarboxylic dianhydride, hexafluoroisopropylidenebisphthalic dianhydride, 9,9-bis(trifluoromethyl)xanthenetetracarboxylic dianhydride, 3,3',4,4'-diphenylsulfone-tetracarboxylic dianhydride, bicyclo[2.2.2]oct-7-ene-2,3,5,6-tetracarboxylic dianhydride, 1,2,3,4-cyclopentanetetracarboxylic dianhydride, 3,3',4,4'-diphenylethertetracarboxylic dianhydride or mixtures thereof. The aromatic dianhydrides, and in particular from this list, are preferred.

The presence of a catalyst of the reaction between the prepolymer P(X)n and the extender Y-A-Y at a content ranging from 0.001% to 2%, preferably from 0.01% to 0.5%, relative to the total weight of two cited coreagents, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification, as described in EP 0 425 341, page 9, lines 1 to 7.

Said prepolymer can be a polyamide prepolymer obtained from:
the polycondensation of at least one aliphatic linear or branched and/or cycloaliphatic diamine and of at least one aliphatic linear or branched and/or cycloaliphatic and/or aromatic dicarboxylic acid, with the optional presence of at least one compound chosen from: a lactam or an aminocarboxylic acid.

Said thermoplastic polymer is preferably an amorphous and/or semi-crystalline aliphatic polyamide and/or an amorphous semi-cycloaliphatic and/or amorphous semi-aromatic and/or amorphous semi-arylaliphatic polyamide. The term "semicrystalline" signifies that said thermoplastic polymer of the invention exhibits a melting peak, measured by DSC, according to the standard according to ISO 11357-2. It is amorphous if there is an absence of any melting peak.

Said polyamide can therefore be an amorphous or semicrystalline polyamide.

More particularly, said polyamide is a biobased (or biosourced) aliphatic polyamide and preferably corresponds to the following formulae: 11, 10.10, 10.12, 12.10, 6.10 or a binary copolymer based predominantly (in moles) on these polyamides with minor units chosen from: 6, 11, 12, 6.6, 6.10, 6.12, 6.14, 10.6, 10.10, 10.12, 10.14, 12.10, 12.12, 12.14. In these minor units, the diamine can be totally or partially replaced with cycloaliphatic diamines such as bis(3,3'-methyl-4,4'-aminocyclohexyl)methane (BMACM), bis(4,4'-aminocyclohexyl)methane (PACM) or isophorone diamine (IPDA) and also with arylaliphatic diamines such as m- and p-xylylene diamines. Likewise, in these minority units, the aliphatic diacid can be totally or partially replaced with aromatic diacids such as isophthalic, terephthalic and/or naphthalene dicarboxylic acid and also with cycloaliphatic diacids such as 1,3- and/or 1,4-cyclohexanedicarboxylic acids.

According to one option of the process of the invention, said polyamide is an amorphous semiaromatic polyamide and corresponds to the following formulae:
6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.10/9.I, 10.12/9.I, 6.10/10.I, 6.12/10.I, 9.10/10.I, 9.12/10.I, 10.10/10.I, 10.12/10.I, 6.10/12.I, 6.12/12.I, 9.10/12.I, 9.12/12.I, 10.10/12.I, 11.6.I/9.I, 11.6.I/10.I, 11.6.I/11.I, 11.6.I/12.I, 11.9.I/10.I, 11.9.I/11.I, 11.9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I12.I, 12/111.I/12.I, 12/11.I/12.I, preceding terpolymer polyamides with 12/ replaced with 9/, 10/, 6.10/, 6.12/, 10.10/, 10.12/, 9.10/ and 9.12/, all the abovementioned polyamides where isophthalic (I) is partially (up to 40 mol %) replaced with terephthalic (T), with naphthalene-2,6-dicarboxylic and/or with 1,3- or 1,4-CHDA (1,3- or 1,4-cyclohexanedicarboxylic acid), with it being possible for all or part of the linear aliphatic diamines to be replaced with branched aliphatic diamines, preferably from trimethyl hexamethylenediamine (TMD), methyl pentamethylenediamine (MPMD) and methyl octamethylenediamine (MOMD), or with cycloaliphatic diamines, preferably from bis(3,3'-methyl-4,4'-aminocyclohexyl)-methane (BMACM), bis(aminocyclohexyl)methane (BACM) and/or isophorone diamine (IPDA), or arylaliphatic diamines, preferably m- or p-xylylene diamines, all the abovementioned polyamides where isophthalic (I) is partially or totally replaced with a linear or branched $C_6$ to $C_{18}$ aliphatic diacid and at the same time with total or partial replacement of the aliphatic diamine with a cycloaliphatic diamine from BMACM, BACM and/or IPDA.

According to another option of said process, said polyamide is a semicrystalline aliphatic polyamide and corresponds to the following formulae: 6, 11, 12, 6.10, 6.12, 6.14, 10.10, 10.12, 10.14, 12.10, 12.12, 12.14 and binary systems combining these homopolymers with one or more aliphatic PA constituents in minor molar proportion, such as: 6, 11, 12, 6.6, 6.10, 6.12, 6.14, 10.6, 10.10, 10.12, 10.14, 12.10, 12.12, 12.14 with, in these minor units, it being possible for the diamine to be totally or partially replaced with cycloaliphatic diamines such as BMACM, bis(4,4'-aminocyclohexyl)methane (PACM) or IPDA and also with arylaliphatic diamines such as m- and p-xylylene diamines, and likewise, in these minor units, it being possible for the aliphatic diacid to be totally or partially replaced with aromatic diacids such as isophthalic, terephthalic and/or naphthalene dicarboxylic acid and also with cycloaliphatic diacids such as 1,3- and/or 1,4-cyclohexanedicarboxylic acids (1,3- or 1,4-CHDA).

According to one more particular and preferred case, said prepolymer is based on biobased amino undecanoic carboxylic acid or based on PA 10.10 derived from sebacic acid and from decane-1,10-diamine, the latter two constituents also being biobased.

The term "natural reinforcing fibers" signifies fibers of plant or animal origin. Regarding said natural reinforcing fibers, they are long fibers chosen from fibers of: flax, hemp, sisal, kenaf, abaca, jute, ramie, wood, bamboo, coconut, castor oil plant, sugarcane bagasse, fibers of *Attacus atlas* silkworms, Argiope spider fiber or a mixture of at least two of these fibers, preferably flax, jute and bamboo fibers and more preferentially flax fibers.

Said assembly of said fibers is in particular an assembly of long fibers and preferably of flax fibers.

The long fibers according to the invention have a shape factor (L/D length to diameter)>1000.

According to one embodiment of the invention, the assembly of fibers represents from 40% to 98% by volume and preferably from 50% to 65% by volume of said composite material. Said assembly of fibers may be random (mat), unidirectional (UD) or multidirectional (2D, 3D, or the like).

In addition to the assembly of the abovementioned fibers, the composite material produced according to the invention may comprise fillers in the dispersed state in the final thermoplastic polymer impregnating said assembly of fibers or fibrous assembly. They may be any filler known to those skilled in the art in the field of composites. They may in particular be fillers which conduct heat and/or electricity, preferably both (conducting electricity and heat), such as metal powder, pulverulent carbon black, expanded graphite, carbon nanofibrils or carbon nanotubes (CNTs), or silicon carbide, boron carbonitride, boron nitride or silicon nitride nanotubes, in particular carbon nanofibrils or carbon nanotubes (CNTs). When conductive fillers are incorporated into the precursor composition in the molten state, it may be advantageous to carry out heating by microwaves or by induction, in particular applicable not only to said precursor composition, but also to said fibrous prepreg which results from said impregnation and also or to said composite material during its processing or final forming, in particular during molding. As conductive fillers for this purpose, use may be made of metal powder, pulverulent carbon black, expanded graphite, carbon nanofibrils or carbon nanotubes (CNTs), or silicon carbide, boron carbonitride, boron nitride or silicon nitride nanotubes, and in particular carbon nanofibrils or carbon nanotubes (CNTs). Reference may also be made, in this respect, to application WO 2010/130930 of the applicant.

When said composite material comprises fillers, and in particular conductive fillers, these fillers can represent for example from 0.1% to 30% by weight, preferably from 0.3% to 15% and more preferentially from 0.3% to 5% by weight of the final thermoplastic polymer or relative to the starting precursor composition, in which composition they are preferably present at the start.

In particular, said long fibers are continuous in the form of assemblies such as fabrics, nonwovens or unidirectional fibrous reinforcements, sheets or strips or braids or they are fibers which have been cut up, as in nonwovens (fiber mats) or felts.

The impregnation step i) can be carried out under a pressure ranging from 1 bar to 30 bar, preferably from 1 bar to 10 bar.

In the process of the invention, the polymerization of step ii) can be optionally completed after the processing step iii), during a separate final step by annealing of said final composite material. This means that the polymerization may not be finished in step ii), which would make it possible, for example, to shorten the molding cycle time, and may be continued in a separate step of storage annealing, without affecting productivity.

According to one option of this process, the impregnation step i) can be carried out in the mold for final processing of said composite. According to one possibility of the process, in this case, said assembly can be formed of a preform of said fibers and said preform can be positioned beforehand in the processing mold. Said impregnation step i) can comprise a direct transfer of said precursor composition in the molten state onto said assembly of fibers, which assembly of fibers can be in the form of a preform of said fibers, positioned beforehand in said processing mold. Still according to this option, said direct transfer can be carried out in the molten state by extrusion of said prepolymer, with addition of said extender in the extrusion screw or preferably with addition of said extender downstream of the extruder by means of a mixer, for example a static mixer. According to this option, the impregnation step i) can be separated in time from the polymerization step ii) and from the final processing step iii) or it is possible for the polymerization step and the processing step to be simultaneous.

According to another option of this process, said step i) of impregnation in the molten state is carried out outside the mold for final processing of said composite and comprises a prior dusting step or a step of coating said assembly of fibers, in a fluidized bed, with said precursor composition in solid powder form, followed by a step of heating and melting said powder, in particular by microwaves or by induction in the case of a precursor composition as defined above according to the process of the invention comprising, in addition to said prepolymer and to said extender, at least one filler which conducts electricity and optionally heat, and optionally by a calendaring step thus making it possible to obtain a preimpregnated fibrous material as intermediate product before the polymerization step ii) and final processing step iii), it being possible for this latter step iii) to also in particular comprise a step of heating said prepreg and/or said composite material, by microwaves or by induction, during this processing step iii), in the case where said precursor composition is as defined just above in the same sentence. Said dusting with powder can be carried out using a vibrating support (sieve) in order to enable the uniform distribution of the powder on said assembly. Still in this context, the polymerization ii) and processing iii) steps can be carried out using said preimpregnated fibrous material described above, as starting material. In this case, the processing step iii) can preferably be carried out by thermocompression or by lamination of at least one preimpregnated fibrous material resulting from said impregnation step i) optionally completed by a final forming by thermoforming or stamping. Such a prepreg can be obtained with an assembly of fibers such as in the form of UD (unidirectional) fabrics, 2D (two-directional) fabrics, or nonwovens. More particularly, said processing step iii) can comprise a step of positioning of at least two preimpregnated fibrous materials resulting (derived) from said impregnating step i), in staggered fashion, on a mold preform, so that they are at least partially superimposed, until the desired thickness is obtained.

With regard to the processing step iii) of the process, in the case where the impregnation takes place in the processing mold, said processing step iii) can be carried out according to a first option, in a closed mold with resin transfer molding (RTM) or by structural reaction injection molding (S-RIM) or by infusion molding. According to a second option, said processing step iii) can be carried out in an open mold and more particularly by pultrusion through a heating die, with optional additional conversion of the products obtained, in particular of superimposed UD bands according to the AFP (automatic fiber placement) technique or by thermocompression.

In the case where the final polymer is semicrystalline, the process of the invention can comprise a step of removing said composite material from the mold at a temperature below the crystallization temperature Ct of said polyamide.

In the process for producing composite material according to the invention, said composite material is in particular a mechanical or structural or semistructural part, in particular in the field of internal aircraft parts, motor vehicle or railway transportation, wind power, water power, construction, panels, sport, water sports and leisure. The composite part can be a molded part and can also be used for parts for an electric vehicle, an electronic unit, a cell phone or a computer.

According to one more particular and preferred case of the process of the invention, it comprises a step of heating by radiation, in particular by laser radiation, with said starting precursor composition comprising specific additives which adsorb at the wavelength of said radiation, in particular laser radiation, more particularly UV or IR laser radiation. As suitable examples of such additives, mention may be made of: carbon black (CB) in the form of CB powder or preferably in the form of masterbatches based on CB and polyethylene (PE) or on CB and polyamide (PA), expanded graphite, $TiO_2$ (titanium oxide), ZnO (zinc oxide) and, in the case of an IR laser, indium tin oxide (sold by Evonik). As an example of a CB+PE masterbatch with approximately 40% of CB, mention may be made of Euthylen® sold by BASF. As an example of a CB+PA masterbatch with approximately 15% of CB, mention may be made of Renol® Black sold by Clariance.

Another subject of the present invention relates to a reactive precursor composition for carrying out the process of the invention, which comprises: a) at least one prepolymer as defined and b) at least one chain extender as defined above, producing said thermoplastic polymer by bulk polyaddition reaction (of said precursor composition), with the melting point or softening temperature of said composition being below 220° C., preferably below 210° C., more preferentially below 200° C. and even more preferentially below 190° C.

The term "precursor composition" signifies, for the present invention, that this composition is the precursor of the final matrix of the thermoplastic polymer or it is the composition from which said final thermoplastic matrix of said composite material is derived by polyaddition reaction.

According to one preferred option, said precursor composition also comprises at least one specific additive which absorbs at the wavelength of a radiation, in particular laser radiation, more particularly UV or IR laser radiation, or at least one filler which conducts electricity and optionally heat as described above or below, preferably carbon nanotubes or nanofibrils. As suitable examples of such additives, mention may be made of carbon black (CB) in the form of CB powder or preferably in the form of masterbatches based on CB and polyethylene (PE) or on CB and polyamide (PA), expanded graphite, $TiO_2$ (titanium oxide), ZnO (zinc oxide) and, in the case of an IR laser, indium tin oxide (sold by Evonik). As an example of a CB+PE masterbatch with approximately 40% of CB, mention may be made of Euthylen® sold by BASF. As an example of a CB+PA masterbatch with approximately 15% of CB, mention may be made of Renol® Black sold by Clariance.

In addition, said composition can comprise fillers in the dispersed state which are in the end contained in the thermoplastic polymer impregnating said assembly of fibers or fibrous assembly. They may be any filler known to those skilled in the art in the field of composites. They may in particular be fillers which conduct heat and/or electricity, such as metal powder, pulverulent carbon black, carbon nanofibrils, carbon nanotubes (CNTs), or silicon carbide, boron carbonitride, boron nitride or silicon nitride nanotubes.

The invention also covers a preimpregnated fibrous material which results from the impregnation in the molten state of an assembly of one or more natural reinforcing fibers, with at least one precursor composition as defined above. This preimpregnated fibrous material can be obtained after an impregnation step i) as defined according to the invention above.

Another subject of the invention relates to the use of a precursor composition as defined according to the invention above, for impregnating a fibrous assembly of one or more natural reinforcing fibers and for producing a preimpregnated fibrous material as described above. More particularly, this use relates to the production of a composite material and said composite material is preferably a molded composite part, more preferentially as a structural or semi-structural part in the fields of aeronautics, motor vehicles, railways, shipbuilding (or water sports), construction, sport, leisure, water power and wind power.

The invention finally covers a composite material obtained by means of a production process as defined according to the invention described above and more particularly using at least one precursor composition as defined above for the impregnation step i) and for the polymerization step ii). More particularly, this composite material can be a molded composite part. According to one preferred case of this composite material, said prepolymer is based on biobased aminoundecanoic carboxylic acid or based on PA 10.10 obtained from sebacic acid and from decane-1,10-diamine, both being biobased, and said (reinforcing) assembly is based on flax fibers and more preferentially said material comprises more than 50%, preferably more than 85% and more preferentially more than 98% by weight of renewable raw materials of natural source (origin).

The following examples are presented in the experimental section which follows in order to illustrate the present invention and its performance levels, and in no way limits its coverage.

EXPERIMENTAL SECTION

1) Preparation of the Prepolymers P(X)n Used for the Composite Material 1.1) Prepolymer 1: Amorphous Diacid Polyamide (PA) 10.I/6.I The following materials and amounts are successively introduced into an autoclave reactor with a capacity of 2 liters:

| | |
|---|---|
| 1,6-hexanediamine (HMDA) | 77.03 g |
| 1,10-decanediamine | 270.19 g |
| isophthalic acid | 493.53 g |
| Rhodorsil ® RG22 | 0.43 g |
| NaH$_2$PO$_2$, 60% in water | 3.43 g |
| water | 285.0 g |

Rhodorsil RG22, an antifoam, is sold by the company Bluestar Silicones.

After closing the reactor, the atmosphere is purged of its oxygen with nitrogen. The reactor is subsequently heated to reach 250° C. inside, the pressure in the reactor reaching 32 bar. The water is gradually removed from the reactor by reduction in pressure over the course of 1 hour down to atmospheric pressure while maintaining an internal temperature of approximately 240° C. The reactor having arrived at atmospheric pressure is subsequently flushed with nitrogen at 25 l/h for 15 minutes. The contents of the reactor are subsequently emptied and cooled in water. After suction-filtering, coarse grinding and drying, 757.1 g of prepolymer are collected.

According to the balance of material and functionality, the functionality $n_{calc}$ of the prepolymer according to the formula described above (page 8) is equal to 2.

1.2) Prepolymer 2: Semicrystalline Diacid Polyamide 11/6.T/10.T

The following are successively introduced into an autoclave reactor with a capacity of 2 liters:

| | |
|---|---|
| 11-aminoundecanoic acid | 75.60 g |
| 1,6-hexanediamine (HMDA) | 65.56 g |
| 1,10-decanediamine | 244.24 g |
| terephthalic acid | 370.93 g |
| Rhodorsil ® RG22 | 0.33 g |
| NaH$_2$PO$_2$, 60% in water | 2.84 g |
| water | 133 g |

After closing the reactor, the atmosphere is purged of its oxygen with nitrogen. The reactor is subsequently heated to reach 235° C. inside, the pressure in the reactor reaching 25 bar. After maintaining these conditions for 1 hour, the water is gradually removed from the reactor by expansion by maintaining 25 bar and by increasing the internal temperature to 265° C. The pressure is then reduced to atmospheric pressure over the course of 2 hours 30 minutes by expansion by gradually increasing the internal temperature to 285° C. The reactor having arrived at atmospheric pressure is subsequently flushed with nitrogen at 25 l/h for 10 minutes. The contents of the reactor are subsequently emptied, cooled on a metal strip, coarsely ground and dried. 642.2 g of prepolymer are collected.

1.3) Prepolymer 3: Amorphous Diacid Polyamide (PA) 10.I/6.I of Mn 2101

The following materials and amounts are successively introduced into an autoclave reactor with a capacity of 2 liters:

| | |
|---|---|
| 1,6-hexanediamine (HMDA) | 72.27 g |
| 1,10-decanediamine | 251.71 g |
| isophthalic acid | 396.33 g |
| Rhodorsil ® RG22 | 0.33 g |
| NaH$_2$PO$_2$, 60% in water | 2.67 g |
| water | 333.0 g |

After closing the reactor, the atmosphere is purged of its oxygen with nitrogen. The reactor is subsequently heated to reach 230° C. inside, the pressure in the reactor reaching 28 bar. The water is gradually removed from the reactor by reduction in pressure over the course of 1 hour 30 minutes down to atmospheric pressure while maintaining an internal temperature of approximately 230° C. The reactor having arrived at atmospheric pressure is subsequently flushed with nitrogen at 25 l/h for 15 minutes. The contents of the reactor are subsequently emptied and cooled in water. After suction-filtering, coarse grinding and drying, 635 g of prepolymer 3 are collected.

According to the balance of material and functionality, the functionality $n_{calc}$ of the prepolymer according to the formula described above (page 8) is 2.

TABLE 1

Characteristics of the prepolymers P(X)n prepared

| Prepolymer No. | Prepolymer structure | X | Tg (° C.) | Mp (° C.) | Ct (° C.) | NH$_2$ (meq/g) | COOH (meq/g) | n calc | Mn calc | Melt viscosity at 100 s$^{-1}$ (Pa·s) | T° melt viscosity temperature (° C.) |
|---|---|---|---|---|---|---|---|---|---|---|---|
| 1 | 10I/6I | carboxy | 88 | — | — | 0 | 1.931 | 2 | 1035 | 3.1 | 200 |
| 2 | 11/6T/10T | carboxy | 94 | 261 | 227 | 0 | 0.78 | 2 | 2564 | 1 | 300 |
| 3 | 10I/6I | carboxy | 95 | — | — | 0 | 0.952 | 2 | 2101 | 3 20 | 250 200 |

2) Preparation of the Composite Material

2.1) Equipment Used and General Conditions for Processing the Composite Material An RTM (reaction transfer molding) process is used to prepare said composite.

The equipment for said RTM process comprises two separate heating chambers which make it possible to separately melt the prepolymer and the chain extender.

Two pistons (one per chamber), operating under 1 to 10 bar, make it possible to convey the two molten constituents into a static mixer and then to inject the reactive mixture into a steel mold containing a fibrous reinforcement.

The residence time in the mixer is short (less than 10 s) and makes it possible to prevent any significant chain elongation. Thus, the viscosity of the mixture can be considered as identical to that of the prepolymer alone at the injection temperature.

The object of the present tests is to illustrate the feasibility of a flax fiber-based composite by RTM, with an amorphous prepolymer PA having a high Tg (prepolymer 1) and a chain extender as described above according to the invention. The use of a semicrystalline prepolymer having a high Tg (prepolymer 2) makes it obligatory to work at high temperature (280° C.) because of its high melting point (265° C.) and this results in degradation of the flax fibers (see below). The use of a PA aliphatic polymer, with a low melting point (PA11) corresponding to a final polymer with a high Mn (and not prepolymer with a low molecular weight) also does not give good results because of the poor impregnation owing to the excessively viscous state (high viscosity) of said polymer.

The fibrous flax reinforcement used is an equilibrated fabric (0°, 90°) of Nattex flax fibers provided by Dehondt (at 800 g/m²). Four stacked layers of this fibrous reinforcement were placed in the mold before injection in order to produce a cylindrically shaped sheet (disk) of composite. The content of fibers in the composite sheet is 60 vol %.

The molar ratio between reactive functions X of the prepolymer P(X)n and Y of the chain extender Y-A-Y is: 1/1 (stoichiometry).

The cylindrically shaped mold is made of steel with a diameter of 70 mm and a height of 4 mm.

The mechanical performance levels in 3-point bending are measured according to the ISO 14125 method.

2.2) Composite Preparation Examples

2.2.1) Example 1 (Counter Example): Use of the PA11 Polymer (Non-Prepolymer)

A T Nat 2P PA11 powder (Arkema), having a viscosity of 500 Pa·s., is injected at a temperature of 200° C., the mold being preheated to 200° C. before filling. Only one of the two chambers of the equipment is used (since there is no chain extender).

Result:

No correct impregnation of the fibers, with the resin (polymer) covering bundles of fibers and significant regions of dry fibers remain after injection. The impregnation result is judged to be poor and unsatisfactory.

| 3-point BENDING | | | DSC | |
|---|---|---|---|---|
| E (GPa) | σ breaking (MPa) | ε break (%) | Tg polymer (° C.) | Tg composite sheet (° C.) |
| 5 | 15 | 0.3 | 50 | 50 |

2.2.2) Example 2 (Invention): Use of Prepolymer 1 (of 10I/6I Type)

Prepolymer 1 (of 10I/6I type), having a molecular weight of 1035 g/mol, and a Tg of 88° C., is melted in one of the chambers before chain elongation. This prepolymer is diacid functionalized. In the other chamber, PBO (bisoxazoline), Allinco 1-3 sold by the company DSM, which is a chain extender bearing 2 oxazoline functions, is melted.

The reactive mixture is subsequently injected at 200° C., in less than 30 s, into a mold preheated to 200° C. The melt viscosity of the mixture is identical to that of prepolymer 1, i.e. 3.1 Pa·s.

Results:

The impregnation is excellent. The mechanical properties and the glass transition temperature (Tg) are given in table 2 below.

TABLE 2

Mechanical properties and Tg measurement of the composite with prepolymer 1 of 10I/6I type

| 3-point BENDING | | | DSC | |
|---|---|---|---|---|
| E (GPa) | σ breaking (MPa) | ε break (%) | Tg prepolymer (° C.) | Tg composite sheet (° C.) |
| 16 | 250 | 2.1 | 98 | 112 |

2.2.3) Example 3 (Counter Example): Use of Prepolymer 2 (Semicrystalline of 11/10T/6T Type)

The semicrystalline prepolymer 2, of 11/10T/6T type, having a molecular weight of 2564 g/mol and a Tg of 94° C., is melted before chain elongation. This prepolymer 2 is diacid functionalized. In the other chamber, PBO (bisoxazoline), Allinco 1-3 sold by the company DSM, which is a chain extender bearing 2 oxazoline functions, is melted.

The reactive mixture is subsequently injected at 280° C., in less than 10 s, into the mold preheated to 280° C. The melt viscosity of the mixture is identical to that of prepolymer 2, i.e. 1 Pa·s.

Results:

The impregnation is good, but the composite has a dark brown color, attesting to a strong degradation of the flax fibers. As a result, the mechanical properties are not measurable.

2.2.4) Example 4 (Counter Example): Use of Prepolymer 3 with the Same Extender as in Previous Examples The same conditions are used, except that the injection and mold temperature is 250° C. with an injection time of less than 30 s. The viscosity of the mixture is identical to that of prepolymer 3, remaining at 1 Pa·s at 250° C. at the outlet of the mixer.

It is noted that, at 250° C., the composite very rapidly becomes dark brown, which is a sign of significant degradation of the flax fibers.

Results:
see table 3 below.

TABLE 3

Mechanical performance levels in 3-point bending
and Tg with composite based on prepolymer 3

| 3-point BENDING | | | DSC | |
|---|---|---|---|---|
| E (GPa) | σ breaking (MPa) | ε break (%) | Tg prepolymer (° C.) | Tg composite sheet (° C.) |
| 14 | 119 | 0.85 | 95 | 110 |

Measurement Methods Used

The melt viscosity of the prepolymer or of the precursor composition is measured according to the reference manual of the manufacturer of the measurement device used, which is a Physica MCR301 rheometer, while flushing with nitrogen at the given temperature under shearing at $100\ s^{-1}$, between two parallel planes having a diameter of 50 mm.

The Mn and $n_{calc}$ of the prepolymer and Mn of the thermoplastic polymer are determined as described on page 8 of the description.

The glass transition temperature is measured using a differential scanning calorimeter (DSC), after a second heating, according to standard ISO 11357-2. The heating and cooling rate is 20° C./min.

The melting point Mp and crystallization temperature Ct are measured by DSC, after a first heating, according to ISO 11357-3. The heating and cooling rate is 20° C./min.

The mechanical properties in 3-point bending are measured according to standard ISO 14125.

The invention claimed is:

1. A process for producing a composite material, wherein the composite material comprises a fibrous assembly of one or more natural reinforcing fibers, impregnated with at least one amorphous or semicrystalline thermoplastic polymer to form a thermoplastic matrix and wherein said process comprises:
  i) a step of impregnation of said fibrous assembly with a precursor composition in the molten state, the precursor composition comprising:
    a) at least one prepolymer P(X)n of said thermoplastic polymer, comprising a molecular chain P having, at its ends, n reactive functions X, with n ranging from 1 to 3, said prepolymer P(X)n having a number-average molecular weight Mn ranging from 500 to 10 000,
    b) at least one chain extender Y-A-Y comprising functions Y which react with at least one of said functions X,
  ii) a step of bulk polymerization by poly(addition), in the molten state, of said prepolymer with said chain extender,
  wherein:
    said thermoplastic polymer of the thermoplastic matrix is the result of said bulk polymerization by polyaddition of said precursor composition; and
    said impregnation i) and polymerization ii) steps take place at a temperature below 230° C.

2. The process as claimed in claim 1, wherein the process comprises an additional step iii) which comprises the processing and the final forming of said composite material.

3. The process as claimed in claim 1, wherein said precursor composition has a melting point (if semicrystalline prepolymer) or a softening temperature (if amorphous prepolymer) below 220° C.

4. The process as claimed in claim 1, wherein said precursor composition, in addition to said prepolymer a) and to said extender b), comprises:
  c) at least one filler which conducts electricity and optionally heat; and/or
  d) at least one additive which absorbs a laser radiation, and wherein said process comprises a step of heating by microwaves or by induction in the case of the presence of c) and/or by laser radiation in the case of the presence of d), said heating step concerning said precursor composition and/or the prepreg which results from said impregnation i) and/or said final forming of said composite material during said processing step iii).

5. The process as claimed in claim 1, wherein said impregnation step is carried out at a temperature such that the viscosity of said precursor composition in the molten state does not exceed, during the impregnation, 100 Pa·s.

6. The process as claimed in claim 1, wherein said thermoplastic polymer is chosen from: at least one polyamide or at least one copolymer of said polyamide, including polyamide-polyether or at least one mixture thereof.

7. The process as claimed in claim 1, wherein said prepolymer P(X)n corresponds to:
  n=1 to 3,
  X is a reactive function among: —OH, —NH$_2$ or —(C=O)OH,
  P is a hydrocarbon-based chain which may be aliphatic or semi-cycloaliphatic or semi-aromatic or semi-arylaliphatic.

8. The process as claimed in claim 7, wherein:
  when X is NH$_2$ or OH:
    either the chain extender Y-A-Y corresponds to:
      Y chosen from the groups: maleimide, under the condition that, if X=amine, the latter is secondary, optionally blocked isocyanate, oxazinone or oxazolinone, and
      A is a carbon-based spacer (or carbon-based radical) bearing the reactive functions or groups Y, A being chosen from:
        a covalent bond between two functions (groups) Y in the case where Y=oxazinone or oxazolinone, or
        a hydrocarbon-based chain having a molecular weight of 14 to 200 g·mol$^{-1}$,
    or the chain extender Y-A-Y corresponds to Y being a caprolactam group and to A possibly being a carbonyl radical or A being terephthaloyl or isophthaloyl,
    or said chain extender (Y-A-Y) corresponds to Y being a cyclic anhydride group and said extender is then chosen from: an aromatic and/or cycloaliphatic,
  and when X is —(C=O)OH (or —CO$_2$H):
    the chain extender Y-A-Y corresponds to:
      Y chosen from the groups: oxazoline, oxazine, imidazoline or aziridine,
    and to
      A being a carbon-based spacer radical as defined above.

9. The process as claimed in claim 1, wherein said thermoplastic polymer is an amorphous and/or semicrystalline aliphatic polyamide and/or an amorphous semi-cycloaliphatic and/or amorphous semi-aromatic and/or amorphous semi-arylaliphatic polyamide.

10. The process as claimed in claim 9, wherein said polyamide is a biobased aliphatic polyamide and chosen from: 11, 10.10, 10.12, 12.10, 6.10 or a binary copolymer based predominantly, in moles, on these polyamides, with minor units chosen from: 6, 11, 12, 6.6, 6.10, 6.12, 6.14, 10.6, 10.10, 10.12, 10.14, 12.10, 12.12, 12.14 with, in these minor units, it being possible for the diamine to be totally or partially replaced with cycloaliphatic diamines and also with arylaliphatic diamines, or with, in these minor units, it being possible for the aliphatic diacid to be totally or partially replaced with aromatic diacids.

11. The process as claimed in claim 9, wherein said polyamide is an amorphous semiaromatic polyamide and corresponds to the following formulae:

6.I, 8.I, 9.I, 10.I, 11.I, 12.I, 6.I/9.I, 9.I/10.I, 9.I/11.I, 9.I/12.I, 9/6.I, 10/6.I, 11/6.I, 12:6.I, 10/9.I, 10/10.I, 10/11.I, 10/12.I, 11/9.I, 11/10.I, 11/11.I, 11/12.I, 12/9.I, 12/10.I, 12/11.I, 12/12.I, 6.10/6.I, 6.12/6.I, 9.10/6.I, 9.12/6.I, 10.10/6.I, 10.12/6.I, 6.10/9.I, 6.12/9.I, 10.10/9.I, 10.12/9.I, 6.10/10.I, 6.12/10.I, 9.10/10.I, 9.12/10.I, 10.10/10.I, 10.12/10.I, 6.10/12.I, 6.12/12.I, 9.10/12.I, 9.12/12.I, 10.10/12.I, 11/6.I/9.I, 11/6.I/10.I, 11/6.I/11.I, 11/6.I/12.I, 11/9.I/10.I, 11/9.I/11.I, 11/9.I/12.I, 11/10.I/11.I, 11/10.I/12.I, 11/11.I/12.I, 6.I/10.I, 6.I/11.I, 6.I/12.I, 10.I/11.I, 10.I/12.I, 11.I/12.I, 12/6.I/10.I, 12/6.I/11.I, 12/6.I/12.I, 12/9.I/10.I, 12/9.I/11.I, 12.9.I/12.I, 12/10.I/11.I, 12/10.I12.I, 12/111.I/12.I, 12/11.I/12.I, preceding terpolymer polyamides with 12/ replaced with 9/, 10/, 6.10/, 6.12/, 10.6/, 10.10/, 10.12/, 9.10/ and 9.12/, all the abovementioned polyamides where isophthalic (I) is partially, up to 40 mol %, replaced with terephthalic (T), with naphthalene-2,6-dicarboxylic acid and/or with 1,3- or 1,4-CHDA (1,3- or 1,4-cyclohexanedicarboxylic acid), with it being possible for all or part of the linear aliphatic diamines to be replaced with branched aliphatic diamines, or with cycloaliphatic diamines, or arylaliphatic diamines, all the abovementioned polyamides where isophthalic (I) is partially or totally replaced with a linear or branched $C_6$ to $C_{18}$ aliphatic diacid and at the same time with total or partial replacement of the aliphatic diamine with a cycloaliphatic diamine from BMACM, BACM and/or IPDA.

12. The process as claimed in claim 9, wherein said polyamide is a semicrystalline aliphatic polyamide and corresponds to the following formulae:

6, 11, 12, 6.10, 6.12, 6.14, 10.10, 10.12, 10.14, 12.10, 12.12, 12.14 and binary systems combining these homopolymers with one or more aliphatic PA (polyamide) constituents in minor molar proportion, such as: 6, 11, 12, 6.6, 6.10, 6.12, 6.14, 10.6, 10.10, 10.12, 10.14, 12.10, 12.12, 12.14 with, in these minor units, it being possible for the diamine to be totally or partially replaced with cycloaliphatic diamines and also with arylaliphatic diamines or, in these minor units, it being possible for the aliphatic diacid to be totally or partially replaced with aromatic diacids and also with cycloaliphatic diacids.

13. The process as claimed in claim 1, wherein said prepolymer is based on biobased aminoundecanoic carboxylic acid or based on PA 10.10 derived from sebacic acid and from decane-1,10-diamine, both these two constituents being biobased.

14. The process as claimed in claim 1, wherein said natural reinforcing fibers are long fibers chosen from fibers of: flax, hemp, sisal, kenaf, abaca, jute, ramie, wood, bamboo, coconut, castor oil plant, sugarcane bagasse, *Attacus atlas* silkworm fiber, Argiope spider fiber or a mixture of at least two of these fibers.

15. The process as claimed in claim 1, wherein said long fibers are continuous, in the form of assemblies from fabrics, nonwovens or unidirectional fibrous reinforcements, sheets or strips or braids or they are fibers which have been cut up, as in nonwovens (fiber mats) or felts.

16. The process as claimed in claim 1, wherein said step i) of impregnation in the molten state is carried out outside the mold for final processing of said composite and wherein the process comprises a prior step of dusting or a step of coating, in a fluidized bed, said assembly of fibers with said precursor composition in the solid powder state, followed by a step of heating and melting said powder, and optionally by a calendaring step thus making it possible to obtain a preimpregnated fibrous material as intermediate product before the polymerization ii) and final processing iii) step, it being possible for the latter step iii) to also comprise, in the case where said precursor composition is as defined in the process as claimed in claim 4, a step of heating said prepreg and/or said composite material, by microwaves or by induction, during this processing step iii).

17. The process as claimed in claim 16, wherein the polymerization ii) and processing iii) steps are carried out using said preimpregnated fibrous material as starting material.

18. The process as claimed in claim 1, wherein said processing impregnation step i) is carried out in the mold of final processing of said composite and wherein step iii) is carried out in a closed mold with resin transfer molding (RTM), structural reaction injection molding (S-RIM) or infusion molding.

19. The process as claimed in claim 1, wherein said impregnation step i) is carried out in the mold of final processing of said composite and wherein said processing step iii) is carried out in an open mold by pultrusion through a heating die, with optional additional conversion of the products obtained, in particular of superimposed UD bands, according to the AFP (automatic fiber placement) technique or by thermocompression.

20. The process as claimed in claim 16, wherein the processing step iii) is carried out by thermocompression or by lamination of at least one preimpregnated fibrous material resulting from said impregnation step i) optionally completed by a final forming by thermoforming or stamping.

21. The process as claimed in claim 1, wherein said composite material is a mechanical or structural or semi-structural part, in the field of internal aircraft parts, motor vehicle or railway transportation, wind energy, water energy, construction, panels, sport, water sports and leisure.

22. A reactive precursor composition for carrying out the process as claimed in claim 1, wherein the composition comprises: a) at least one prepolymer P(X)n of said thermoplastic polymer, comprising a molecular chain P having, at its ends, n reactive functions X, with n ranging from 1 to 3, said prepolymer P(X)n having a number-average molecular weight Mn ranging from 500 to 10 000 and b) at least one chain extender Y-A-Y comprising functions Y which react with at least one of said functions X, and producing said thermoplastic polymer by bulk polyaddition reaction, with the melting point or softening temperature of said composition being below 220° C., and also comprises at least one specific additive which absorbs at the wavelength of a laser radiation, or at least one filler which conducts electricity and optionally heat.

23. A preimpregnated fibrous material, wherein the material results from the impregnation in the molten state of an assembly of one or more natural reinforcing fibers, with at least one precursor composition as defined in claim 22.

24. A method for impregnating a fibrous assembly of one or more natural reinforcing fibers or for producing a preimpregnated fibrous material as defined in claim 23 or for producing a composite material, in the fields of aeronautics, motor vehicles, railways, shipbuilding, construction, sport, leisure, water power and wind power wherein the method comprises the use of a precursor composition comprising: a) at least one prepolymer P(X)n of said thermoplastic polymer, comprising a molecular chain P having, at its ends, n reactive functions X, with n ranging from 1 to 3, said prepolymer P(X)n having a number-average molecular weight Mn ranging from 500 to 10 000 and b) at least one chain extender Y-A-Y comprising functions Y which react with at least one of said functions X, and producing said thermoplastic polymer by bulk polyaddition reaction, with the melting point or softening temperature of said composition being below 220° C. and also comprises at least one specific additive which absorbs at the wavelength of a laser radiation, or at least one filler which conducts electricity and optionally heat.

25. A composite material, wherein the composite material is obtained by means of a production process as defined in claim 1.

26. The composite material as defined in claim 25, wherein the prepolymer of said precursor composition is based on biobased amino undecanoic carboxylic acid or based on PA 10.10 and obtained from sebacic acid and from decane-1,10-diamine, both being biobased and, wherein said assembly is based on flax fibers.

* * * * *